United States Patent [19]

Tamblyn et al.

[11] 4,135,571
[45] Jan. 23, 1979

[54] THERMAL STORAGE SYSTEMS

[76] Inventors: Robert T. Tamblyn, Littlebrook Farm, R.R. #2, Gormley, Ontario, Canada, L0H 1G0; James W. S. Rose, 35 Shawfield Crescent, Don Mills, Ontario, Canada, M3A 1R9; Paul N. Silverthorne, Willow Creek Farm, R.R. #1, Gilford, Ontario, Canada, L0L 1B0; Gordon K. Broadhead, 337 Kingsdale Ave., Willowdale, Ontario, Canada, M2N 3X7

[21] Appl. No.: 816,169

[22] Filed: Jul. 15, 1977

Related U.S. Application Data

[62] Division of Ser. No. 567,861, Apr. 14, 1975, abandoned.

[30] Foreign Application Priority Data

Apr. 1, 1975 [CA] Canada .................................. 223479

[51] Int. Cl.² .............................................. F24D 11/00
[52] U.S. Cl. ......................................... 165/18; 165/50; 165/85; 165/104 S; 62/434; 237/56; 237/66
[58] Field of Search .................. 165/18, 50, 104 S, 85; 126/400; 62/434, 430; 237/56, 66

[56] References Cited

U.S. PATENT DOCUMENTS

| 3,234,920 | 2/1966 | Kemmetmuller et al. .......... 122/7 A |
| 3,931,806 | 1/1976 | Hayes ................................ 165/18 X |

FOREIGN PATENT DOCUMENTS 495303  8/1950  Belgium ................................ 165/104 S

*Primary Examiner*—Albert W. Davis, Jr.
*Attorney, Agent, or Firm*—Watson, Cole, Grindle & Watson

[57] ABSTRACT

Disclosed are suitably structured storage tanks which substantially eliminate blending problems in thermal storage systems. More particularly is disclosed floatable baffle and flexible diaphragm means for preventing blending of different temperatures of water in a storage tank. Also disclosed is a thermal storage system wherein the tanks are at the base of a building and which includes the use of energy conserving turbines to further enhance the benefits of thermal storage. Direct pumping entry of the storage water at a low pressure is permitted into the load circuit which is at a substantially higher pressure and the turbine conserves energy required in the pumping.

8 Claims, 10 Drawing Figures

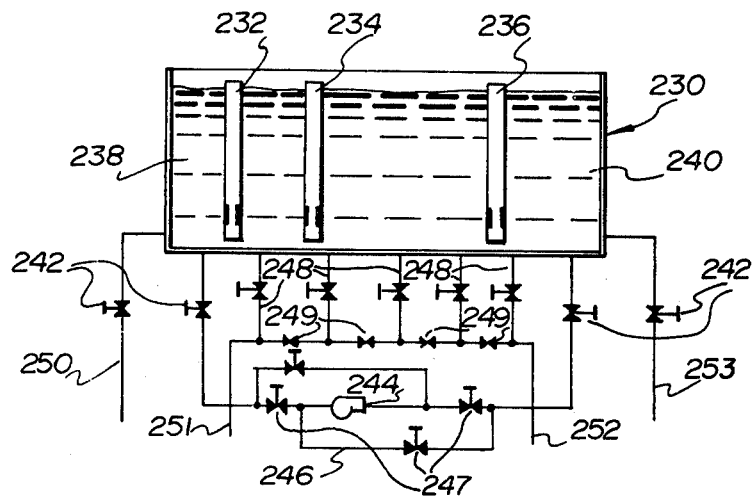
FIG. 6
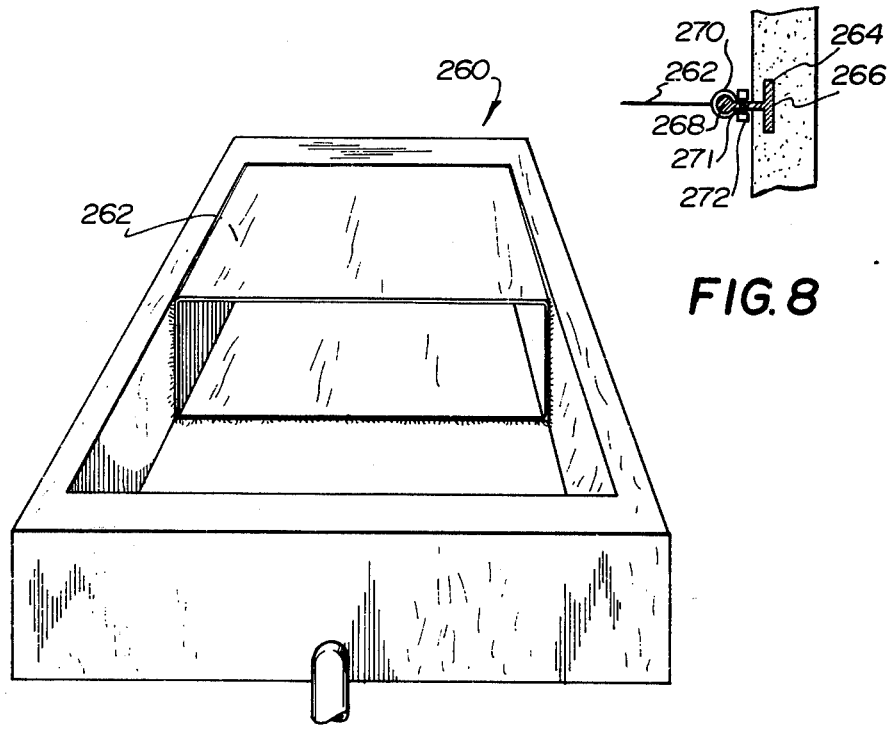
FIG. 8
FIG. 7

THERMAL STORAGE SYSTEMS

The present application is a divisional application of application Ser. No. 567,861, filed Apr. 14, 1975, now abandoned.

This invention relates to thermal storage tanks which can be used in cyclic heating and cooling systems and, more particularly, to anti-blending devices used in the storage tanks as well as to use of such storage tanks in cyclic heating and cooling systems and energy conservation aspects within such systems.

BACKGROUND

Thermal storage offers significant potential for coping more economically with cyclic heating and cooling loads in buildings. Thermal storage concepts are intimately associated with the energy conservation field and with today's energy problems, consideration of the advantages to be gained from thermal storage, properly implemented, is essential.

Heating storage can be effected by storing surplus heat from an occupied period in a building for reuse during an unoccupied interval. Where fuel rates for generated heat are higher than energy rates for reclaimed heat, storage can reduce heating costs. Those skilled in the art to which this invention relates will appreciate that a typical heat gain-loss chart for a building having heat reclaim and a changeover point of about 10° F. illustrates the immense amount of heat surplus in a building every year compared with the amount of heat required to be generated. With an appropriately designed thermal storage system in a building having a 10° F. changeover, there could be upwards of 67% of the generated heat requirement provided out of the thermal cushion for a 50° F. differential. A significant saving in fuel costs may be made.

Cooling storage permits the use of smaller chillers, which can regenerate storage during unoccupied intervals of a building and derive help from it for occupied hours. This does nothing to reduce daily requirements of the cooling load but it does reduce chiller device. If one took a typical chiller demand curve (chiller demand-% vs. time of day) and straightened it out over 24 hours, one would find that a chiller machine of less than 50% the size required on the typical office building load and going flat out would develop about the same ton/hours as the typical machine. The smaller machine demands less electricity at any one period of time, and for demand-sensitive electric rates, the seasonal cost of cooling energy can be reduced significantly. For example, in Ontario, a demand reduction in electricity of 30% in a typical community would provide about a 20% saving in the power bill for electric cooling. The saving would be even greater, i.e., about 32%, in Toronto. At least 90% of the communities in Canada are demand sensitive with regard to electricity costs.

Buildings themselves provide their own storage which can be used advantageously if the control system is designed for that purpose. For example, in cooling seasons, the building can be used to reduce cooling demand if the mass is precooled over-night and the temperature allowed to rise through acceptable limits during occupied hours. Building storage varies, but cooling demand can be reduced by up to 20% if average space temperature in the building is allowed to rise by ½° F. per hour through the occupied periods of the day. Building mass is also available to reduce heating cost through use of solar gain during the day.

The use of water storage tanks properly incorporated with a heating and cooling system for a building provide an even more effective means of conserving energy through thermal storage. Such systems, in concept, store water in tanks at preselected temperatures, which water is drawn out of storage during occupied periods of the building to supplement the demands of the system at that time, with return water of the system being pumped back into the storage tank. During unoccupied periods of the building, the system continues to run primarily for the purpose of returning the stored return water to the preselected temperature for the next day cycle. The cost of storage tanks does not have to be an extra cost. There is a trade off in being able to purchase a smaller less expensive chiller. Furthermore, with demand-sensitive electricity rates and the potential saving in fuel, the use of thermal storage can pay for itself over a relatively short period of time.

However, in the past, such systems have not met with much practical success. One of the primary problems has been the temperature blending of water in the storage tanks, and although there may be cases where blending exacts no penalty (or is even desirable), there are many situations where blending can nullify the benefits of thermal storage. For example, consider the case of storage used to provide 42° F. water for a daily cooling cycle. Blending from returning 60° F. water, if permitted, would preclude the latent value of the chilled water long before the sensible cooling effect of the storage was exhausted. Systems which have depended on the principle of buoyancy for anti-blending have been unsuccessful and this is particularly true of chilled water in the 40° F. to 60° F. range where the buoyancy effect of water is at its least. Another problem is encountered in using a thermal storage system wherein the storage tanks are at the bottom or are bottomside of a multi-storey building. The pressure in a chilled water line, for example at the top of the building, may be about 35 psi, whereas at the bottom of the circuit, the pressure due to static regain may be about 150 psi. The pressure in the storage tank circuit may only be about 30 psi or lower. It is possible to separate the hydraulic head of the building from the open storage through the use of a convertor. However, such convertors are not only massive, but are expensive as well. Furthermore, the convertors are up a vital 5° F. of a narrow cooling storage range.

SUMMARY OF THE INVENTION

It is an aspect of this invention to provide suitably structured storage tanks which substantially eliminate blending problems in thermal storage systems.

It is a further aspect of this invention to provide an appropriate bottomside thermal storage system which includes the use of energy conserving turbines to further enhance the benefits of thermal storage and which permits direct entry of the storage water at a low pressure into the load circuit which is at a substantially higher pressure.

The invention contemplates a thermal storage tank having peripheral walls and opposed end walls capable of holding water at two different temperatures and with means for feeding and receiving water at these temperatures. Means are provided for separating the different temperatured water and preventing blending thereof comprising an impervious flexible membrane in the shape of a bag having a closed end and an open end and capable of taking the shape of either end wall, the open end of the membrane being secured about the peripheral walls of the tank at substantially the mid-point thereof between the end walls.

The invention also comprehends a system for conditioning a load to a predetermined temperature wherein the load is in a closed water piping circuit. The system includes pump means for pumping water about the circuit, heat transfer means for conditioning water in the circuit prior to the load to a second predetermined temperature in order to condition the load to the first predetermined temperature, and thermal storage means including means for separating the thermal storage means into variable volume chambers. The chambers include a first chamber capable of storing water substantially at a third predetermined temperature and a second chamber capable of storing return water at a fourth temperature. Means are provided for selectively withdrawing water of the third temperature from the first chamber and introducing it into the circuit in order to maintain the second predetermined water temperature. Means are also provided for permitting a substantially equivalent amount of return water to flow into the second chamber and be retained therein at the fourth temperature. The means for separating the thermal storage means into the first and second variable volume chambers prevents blending of water at the substantially third predetermined temperature with water at the fourth temperature and varies the volume of the first and second chambers in response to water withdrawn therefrom and flowing thereinto. Means are provided for selectively regenerating the first chamber with water at the substantially third predetermined temperature so that the thermal storage means may contain substantially all water at the substantially third predetermined temperature. Preferably, the separating the anti-blending means in the system is the flexible membrane.

The invention further contemplates the above conditioning system wherein water pressure in the circuit including the load is at a first pressure and water in the thermal storage means is at a second pressure substantially lower than the first pressure. The means for selectively withdrawing water from the first chamber and introducing it into the load circuit includes further pump means and the means for permitting a substantially equivalent amount of return water to flow into the second chamber from the load circuit includes turbine means through which water from the load circuit passes. A prime mover, such as an electric motor, is operatively connected to the further pump means. The turbine is also operatively connected to the prime mover whereby energy required to pump water from the second pressure to the first pressure is conserved through flow of return water through the turbine means.

Other aspects and objects of the invention will become apparent from an appreciation of the detailed description herein.

BRIEF DESCRIPTION OF THE DRAWINGS

FIG. 6 is a cross-sectional view of a storage tank with a plurality of movable baffle anti-blending devices and capable of handling water suitable for either heating, cooling or both modes of conditioning a building.

FIG. 7 is a pictorial view of a storage tank having a diaphragm baffle anti-blending device.

FIG. 8 is a partial view of means for securing the diaphragm baffle to the tank walls.

DETAILED DESCRIPTION OF THE PREFERRED EMBODIMENTS

Figure 1:
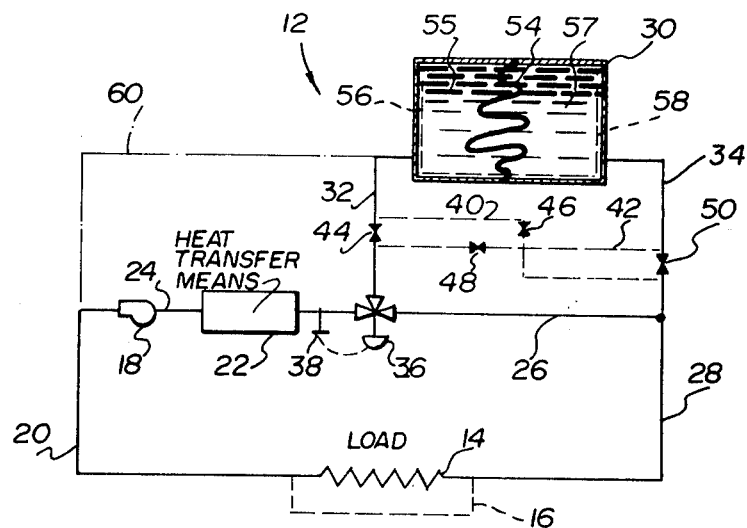
FIG. 1 is a schematic diagram of a piping circuit suitable where the storage tanks are topside.
Figure 2:
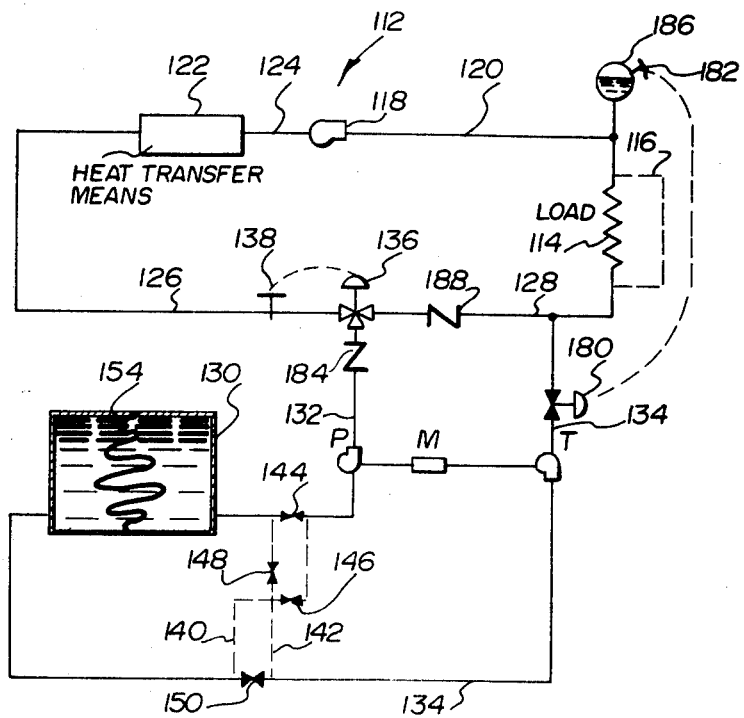
FIG. 2 is a schematic diagram of a piping circuit suitable where the storage tanks are bottomside.

Now referring to the drawings and, particularly, FIGS. 1 and 2, FIG. 1 schematically illustrates piping circuitry for conditioning a load wherein the storage tank is above or substantially level with the level of the load. FIG. 2 schematically illustrates piping circuitry for conditioning a load wherein the storage tank is at a location significantly below the level of the load.

Referring particularly to FIG. 1, the circuit 12 schematically shown may be adapted for conditioning, that is by either heating or cooling, a load 14 which load 14 designates the total load to be conditioned and the equipment thereof. For the sake of further description of the circuitry of FIG. 1, it will be assumed that load 14 represents a building to be conditioned. Accordingly, the circuit of FIG. 1 may be adapted for either heating or cooling a building. If the concept of the circuit is adapted for cooling, load 14 represents the total cooling load required by the building spaces to be conditioned and the equipment to handle such.

On the other hand, it will be appreciated that if the principle of circuit 12 is adapted for heating, load 14 represents the total heating load required by the particular building and the equipment to handle such. For example, in a heating mode, load 14 represents perimeter radiation units whereas in a cooling mode, load 14 represents fresh air handling means and compartment units of a compartmentalization air conditioning system.

A bypass circuit 16, shown in dotted lines, removes the load 14 from the water circuit and the location of appropriate isolation valves (not shown) to accomplish this as desired will be appreciated by those skilled in this art. Water pump 18 pumps water through the circuit and is connected to the water inlet side of load 14 by suitable piping denoted as 20. A heat transfer means 22 is connected to pump 18 through suitable piping denoted as 24 and is connected on the other side to the return water side of load 14, through suitable piping denoted as 26 and 28. Heat transfer means 22 represents a chiller in a cooling mode whereas in a heating mode, it represents means for providing heat to the water in the circuit and could be a clean condenser. Heat transfer means 22 has not, for the sake of clarity and circuitry simplicity, been shown associated with another water circuitry (such as a cooling tower in a cooling mode) although those skilled in this art will appreciate that this omission, or the omission of other non-essential aspects of such circuitry do not detract from the utility of the schematically represented water circuitry.

A thermal storage tank 30 is connected to piping 26 through a suitable piping denoted as 32 and 34, these pipings connecting to tank 30 at opposite sides or ends thereof and pipe 32 connecting with piping 26 via a three way temperature responsive control valve 36. The thermostat 38 for valve 36 is located in line 26 before the heat transfer means 22. Between lines 32 and 34 and shown in dotted lines are crossover lines 40 and 42 and valves 44, 46, 48 and 50 provide for appropriately connecting and directing water through these lines as desired and as indicated more fully hereinafter. Storage tank 30 is closed and includes an anti-blending membrane 54 which is secured peripherally about the sides, bottom and top of tank 30, intermediate the ends thereof, to effectively separate tank 30 into two distinct chambers 55 and 57. As more fully set out hereinafter, membrane baffle 54 is constructed such that it can assume positions at the respective ends of tank 25 such as shown by dotted lines 56 and 58 in FIG. 1 in addition to positions such as that shown in solid line.

Now considering the operation of the water circuitry in FIG. 1, for example in a cooling mode, we can assume that during the day when cooling is required, the temperature of the water entering cooling load 14 and therefore leaving the heat transfer means (chiller) 22 must be about $x°$ F. (e.g. 42° F.) whereas the return water leaving cooling load 14 is about $y°$ F. (e.g. 60° F.). In accordance with aspects of this invention, we have, however, sized heat transfer means (chiller) 22 so that it is only capable of cooling water of $(x + y)/2°$ F. (e.g. 51° F.) down to $x°$ F. Storage tank 30 has some water at about $x°$ F. and this is blended with some $y°$ F. in line 26 to provide $(x + y)/2°$ F. water entering chiller 22. The amount of $x°$ F. water from storage 30 used to accomplish this blending equals the amount of $y°$ F. which bypasses line 26 and enters the right hand side of storage tank 30 via pipe 34. This using up of $x°$ F. water on one side of membrane 54 and the replacement of that amount of water by $y°$ F. water on the other side of membrane 54 continues (provided the system including the tank has been properly designed) until the cooling load is no longer required, for example, at about 6:00 p.m. when people or the majority of them have left for the day. At that time or thereabouts, the appropriate valves are operated to effect bypassing of the cooling load 14 through piping 16 and valves 44 and 50 are shut with valves 46 and 48 being opened. The heat transfer means (chiller) 22 continues to operate, cooling $(x + y)/2°$ F. water to $x°$ F. which chilled water bypasses load 14 and continues in pipes 28 and 26. However, because of the switch in crossover valves 44–50, $y°$ F. water flows from tank 30 through pipes 34, 42 and 32 to temperature responsive valve 36 which blends the $y°$ F. water from storage with $x°$ F. water in line 26 to $(x + y)/2°$ F. water, acceptable for chiller 22. Some of the $x°$ F. water in line 28 continues through lines 34, 40 and 32 to the left hand side of storage tank 30. It will be appreciated that the running of the system in this manner overnight (that is for example until 6:00 a.m. or thereabouts, or until all $y°$ F. water has been replaced in the storage tank with $x°$ F. water) replenishes the storage tank 30 with water at a temperature which will be available during the next day cycle, (the crossover lines having been switched back and the load brought on) to assist or help the heat transfer means (chiller) 22 provide adequate building cooling.

As an alternative to crossover piping 44 to 50, the circuitry could, for example, eliminate the need for same by having piping 60 shown in a dot-dash line (isolation valves not shown) which when put on line through operation of appropriate valves in line 20 (not shown) would direct the water back to line 32. A portion of the water would be pumped to storage 30 and a portion would be throttled through blending valve 36 to provide $(x + y)/2°$ F. water entering heat transfer means 22 when blended with $y°$ F. water coming via piping 34 and 26 from the other side of membrane 54 of storage tank 30.

Persons skilled in the art will appreciate the adaptability of the circuit 12 in a heating mode in which case the water temperature $x°$ F. will be higher than $y°$ F. temperature water and the blending of water by valve 36 will be responsive to the temperature for which thermostat 38 is set and the designed handling capabilities of heat transfer means 22 in such mode. The provision of auxiliary heating means in circuit 12 is contemplated if necessary to handle the demands of load 14 but has not been shown for the sake of clarity and simplicity in illustrating one of the main aspects of this invention, namely, the anti-blending membrane or diaphragm 54 of the thermal storage tank 30.

Now referring more particularly to FIG. 2, there is schematically illustrated a piping circuitry which will be discussed with respect to conditioning a load such as a building wherein the storage tank is at the bottom or base of the building being conditioned whereas the load is above the storage tank and the heat transfer means (e.g. the condenser or chiller) is topside the building.

The load circuitry 112 includes load 114 which, as previously noted with reference to FIG. 1, schematically represents the heating load or cooling load of the building and the equipment which handles it on a floor by floor, space by space basis, depending on the mode of use of the circuitry. Bypass 116 enables the load to be bypassed and again it will be appreciated that suitable isolating valves, not shown, will be available in the piping circuits to accomplish this. Heat transfer means 122 is connected at its outlet end to load 114 via piping 120 and 124 and through pump 118. The inlet side of heat transfer means 122 is connected to the outlet end of load 114 via piping 126 and 128. Storage tank 130, being at the bottomside or base of the building being conditioned is connected to the load piping circuit, namely pipings 126 and 128, via pipings 132 and 134, the junction of piping 132 and 126 being through temperature responsive valve 136, responsive to thermostat 138. The dotted crossover pipings 140 and 142 and related isolation valves 144 to 150 are present in a similar manner and for the same purpose as those shown in the load circuitry of FIG. 1. However, a pump P is located in piping 132 in order to pump water from storage tank 130 and the storage tank circuit (which is at a low pressure such as 30 psi) into the load circuit which at its low point has a water pressure due to static gain of about 150 psi while at the top of the building may have a pressure of only about 35 psi. Check valve 184 retains such pressure within the load circuit. Pump P is driven by a double shafted motor M, the other shaft of motor M being connected to turbine pump T which is located in piping 134. A pressure responsive valve 180 is located in line 134 and the valve 180, with pressure-stat 182 located in closed expansion chamber 186 maintains the water pressure within the load circuit at the low point at say 150 psi (and therefore at the high point, about 35 psi). A check valve 188 is located in line 126 between the connections of lines 132 and 134 therewith. The expansion chamber 186 in communication with piping line 120 provides for expansion of fluid in the load circuit. In the topside circuitry 12 of FIG. 1, storage tank 30 itself can provide for expansion of fluid in such a circuit.

In operation, assuming cooling mode of operation for the circuit and assuming a temperature differential across the cooling load 14 of x° F. to y° F. (e.g. 42° F.–60° F.) and a heat transfer means (chiller) capacity which can only handle the cooling of $(x + y)/2°$ F. (e.g. 51° F.) water to x° F., water temperature responsive valve 136 blends y° F. water returning from load 114 via line 128 with x° F. water in line 132 from one side of storage tank 130 to maintain the appropriate temperature of $(x + y)/2°$ F. in line 126 entering heat transfer means (chiller) 122. The pressure in the load circuit is maintained relatively constant at the exemplified pressures of 35 psi at the top and 150 psi at the bottom by virtue of pressure responsive valve 180. Valve 180 opens and closes in response to a build-up or reduction in pressure in the load conditioning circuit and expansion chamber as a result of water being pumped into such circuit by pump P. The return of water at a pressure of 150 psi in the load circuit to the pressure, e.g., 30 psi, in the storage tank circuit causes operation of turbine pump T. Rotation of such turbine T and its operative connection to motor M provides an energy conserving feature to the power requirements of pump P. During non-occupied periods for example from 6:00 p.m. until 6:00 a.m., valves 144–150 are actuated to bring into service crossover piping 142, 144 and load bypass 116 is brought into service. Heat transfer means (chiller) 122 and the pumps 118 and P continue to operate whereby x° F. water replenishes the right side of storage tank 130 from heat transfer means 122 via piping 124, 120, bypass 116, piping 134 and 142. The y° F. water in the left hand side of tank 130 is withdrawn through piping 134, piping 140, piping 132 and is pumped into the load circuit blending with x° F. water in piping 128 to provide $(x + y)/2°$ F. at the inlet of the heat transfer means 122. When the tank is completely regenerated, it is ready for the next day cycle supplementing chilled water in this mode of operation to the cooling load circuitry.

Accordingly, it will be seen that with the bottomside thermal storage system of FIG. 2, the use of the recovery turbine impeller linked to the same pump shaft as the pump impeller permits recovery of a substantial amount of the energy used to pump from the open storage into the closed building load circuit. The pressure break between the hydraulic building head and open storage is intended to take place across the turbine T and Recovery of this energy can be from 60 to 80% depending on the care with which the recovery turbine impeller is designed and controlled. Since direct introduction of storage water into the load circuit is possible, the upwards 50 of heat transfer loss using convertors has been eliminated. Further, the energy necessary to accomplish such introduction is conserved through the turbine being operatively connected to the pump motor.

FIGS. 1 and 2 depict circuitry wherein the heat transfer means is basically shown as in series with the load. It is quite possible, however, to relocate the heat transfer means to place it, for example, in parallel at least for part of the time with the storage tanks 30 and 154 respectively without detracting from the inventive concept of the present invention. When the heat transfer means is in parallel with the storage tank, crossover lines are not required in order to regenerate the storage tank. Indeed, regeneration can take place while the heat transfer means is on line during the daytime if the load requirements permit.

FIGS. 3 to 7 inclusive more fully set forth the structure of storage tanks and, in particular, the anti-blending devices for such tanks. Although it is possible to control blending to some extent through fixed labyrinth baffling means, it is not particularly efficient and a great number of baffles are necessary, with the attendant construction costs, if any significant degree of anti-blending efficiency is to be achieved.

Figure 3:
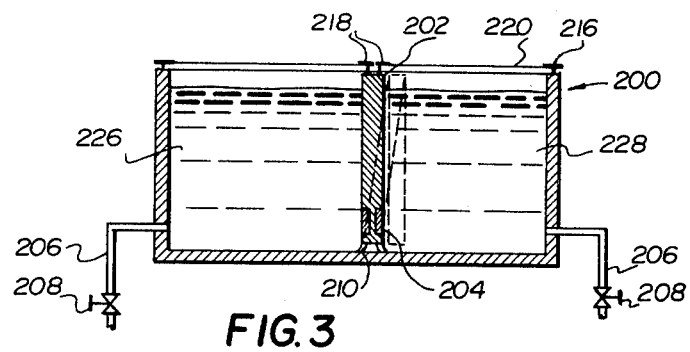
FIG. 3 is a cross-sectional view of a storage tank showing a movable baffle.
Figure 4:
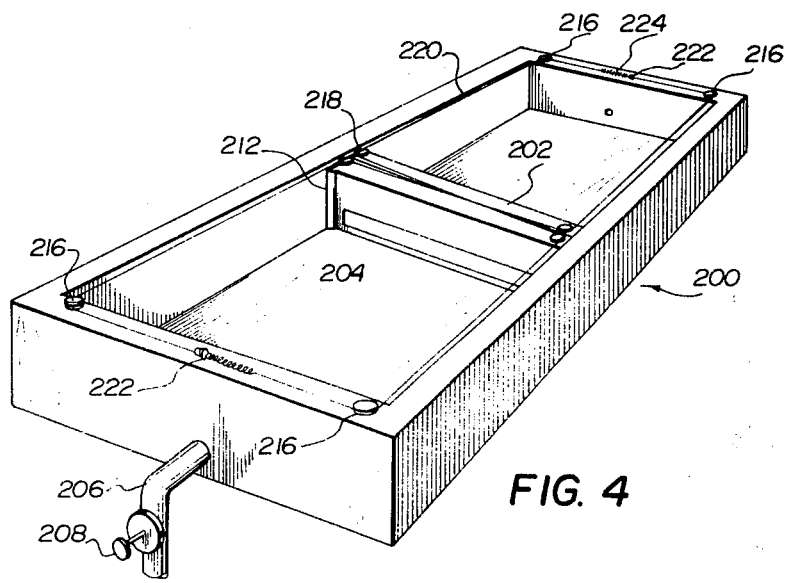
FIG. 4 is a perspective view of the storage tank as shown in FIG. 3.
Figure 5:
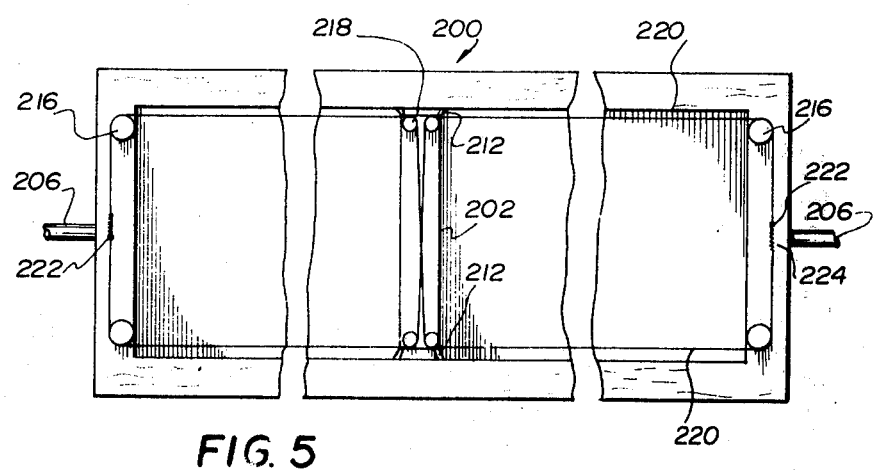
FIG. 5 is a plan view of the storage tank of FIG. 4 showing the guide mechanism.

One embodiment of a preferred anti-blending apparatus for a storage tank is a floating baffle more particularly illustrated in FIGS. 3, 4 and 5. Tank 200 has a floating baffle 202 and the tank is shown open on top, although some covering, can be provided if desired. Baffle 202 is constructed and appropriately weighted by weights 204 so that it substantially floats in the water with the bottom and side edges of the baffle proximate the respective bottom and side edges of tank 200. Pipings 206 and isolation valves 208 are provided as inlet and outlet means for water in tank 200. Baffle 202 does not rest on the bottom of the tank 200 but there are preferably flexible seals 210 such as rubber flanges which would extend from the bottom of baffle 202 and touch the tank bottom. Similar type seals 212 are used on the sides of the baffle. A mechanism such as that shown more particularly in FIG. 5 is used to retain baffle 202 in parallel relationship with the ends of tank 200 (and perpendicular to both sides thereof). The mechanism 202 includes a pulley wheel 216 suitably mounted adjacent each corner of the tank 200 with two pulley wheels 218 at each end of baffle 202. A rope or wire means 220 is anchored at each end of tank 200 at 222 and is entrained about pulleys 216 and 218 as shown, spring 224 providing a slight biasing and shock-absorbing means.

As shown in FIG. 3, when water enters tank chamber 226, the water level in chamber 226 rises above that in chamber 228, thereby causing a greater head in chamber 226 than that in chamber 228. The differential in head causes the top portion of the baffle 202 to move to the right resulting initially in baffle 202 slanting slightly as shown, exaggeratedly, in FIG. 3. In due course, the bottom weighted floating baffle 202 will again assume a vertical position but to the right slightly of its previous position. Accordingly, the baffle 202 floating in tank 200 "walks" back and forth from end to end of tank 200 effectively maintaining the water level in chambers 226 and 228 of the tank substantially the same although the volumes of the chambers will vary significantly.

It will of course be appreciated that storage tank 200 is in a closed water system and the level of water and therefore the volume of water in the tanks as a whole remains substantially constant at all times and it is on this basis and with this in mind that the floating baffle is designed. When water is drawn from one chamber, for example, chamber 226, water is put into chamber 228, the only difference is that the water on each side of baffle 202 is at a different temperature. The pressure difference across baffle 202 at any one time is very slight as baffle 202 is constantly adjusting its position relative to the ends of the tank 200 to equalize the pressure in the chambers. Accordingly, actual leakage of fluid between chambers 226 and 228 around baffle 202 and seals 210, 212 is minimal and thermal leakage is kept to a minimum through using insulating material such as styrofoam for or as a part of the baffle 202. The tank itself is also preferably insulated with insulating material such as styrofoam or the like. A preferred insulating material is foam glass which is a close cell material which never absorbs water and can be used to line the tank as well as insulate the outside.

FIG. 6 shows a tank 230 having three, bottom weighted but floating baffles 232, 234 and 236. Tank 230 serves to store both water for the heating system and water for the cooling cycle. To the left of center baffle 234 is the heating water storage section 238 whereas the cooling water storage section 240 is to the right as shown in FIG. 6. Pipings 250, 251 act as water inlet and outlet means with regard to the heated water storage section 238 and pipings 252, 253 provide water inlet and outlet means with regard to cooling storage section 240; isolation valves 242 are provided for obvious reasons. It will be appreciated by those skilled in this art that there are times during a year when more heating water will be required than cooling water and vice versa. Indeed during the Summer periods probably all the tank will be dedicated to cooling water and middle baffle 234 would be moved as far left as possible (along with baffle 232). During Winter periods, the tank could be dedicated to heating water primarily, with only a small portion of the tank dedicated to cooling. In this latter case, baffle 234 would be moved as far right as required by the minimal cooling load (along with baffle 236). In order to move baffle 234 a small pump 244 and piping circuit 246 which includes various valves 247 is provided so that the total amount of water in section 238 may be altered relative to that in section 240 and vice versa. Piping lines 248 and related valves 249 provide tapping into various portions of the tank in order to provide suitable connection with pipings 251, 252 depending where baffle 234 is. In this manner, it will be apparent that one can dedicate tank 230 to more or less heating or cooling as demand requires during the various seasons during a year. With this type of set up a single tank could provide adequate storage facilities regardless of whether the demand requirement is primarily for heating water, cooling water or both during intermediate seasons, where one is working from both ends of the tank 230. The decision to shift intermediate baffle 234 would be that of the operator of the system depending on his decision as to heating and cooling requirements of the systems at the particular period of year, although the location of the baffle 234 for any particular system could be computerized. Baffles 232 and 236 each operate in the same manner as baffle 202 in FIG. 4.

FIG. 7 shows a second embodiment of a preferred form of baffle which has already been shown schematically in FIGS. 1 and 2. Tank 260 is shown with an impervious flexible membrane baffle 262 secured to the bottom sides and top (shown removed) of tank 260 intermediate the length of tank 260. Membrane baffle 262 is preferably constructed and sewn into a rectangular (bag) shape in order that it may assume a shape close to that of the tank. The membrane is preferably constructed on a DACRON ®-fibre net covered on both sides with HYPOLON ®. The membrane is approximately water weight. Other materials such as nylon coated with various plastics or materials such as PVC or TEFLON ® may be used. The open end of the membrane is sealed against the center line of the tank 260 across the top and bottom and up the sides. FIG. 7 illustrates the membrane extended toward one end position of tank 260 but it will be appreciated (as shown in FIGS. 1 and 2) that membrane 262 will assume a random position intermediate the ends of the tank 260 physically separating tank 260 into two chambers. The actual means of securing the membrane to the tank walls is not significant but a method of doing same is shown in FIG. 8. The tanks referred to in this disclosure are preferably of concrete and it will be appreciated that in pouring the concrete for the tanks an anchor device 264 such as that shown in FIG. 8 may be partially embedded into the concrete at the appropriate location about the top, bottom and sides of the tank. The anchor device is basically "T" shaped in cross section with flange 266 secured in concrete and the bulbous end 268 extending into the tank. Membrane 262 has a bifurcated edge 270 which encloses bulbous end 268 and is secured on opposite sides of portion 271 of device 264 by means of through washered bolts 272 or other equivalents. Although the flexible membrane has been shown as moving horizontally from end to end in FIGS. 1, 2 and 7, it will be obvious that it may be alternatively secured to the walls of the tank in such manner as to move vertically from top to bottom.

Figure 9:
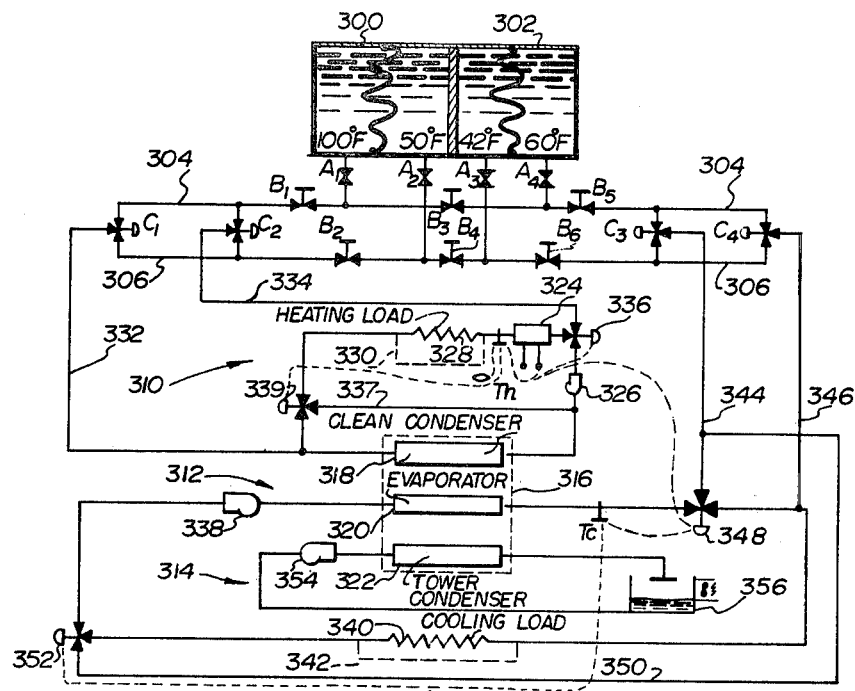
FIG. 9 is a schematic diagram of a piping circuit showing a topside location for the storage tanks and the interconnection thereof to a heating circuit and a cooling circuit for a multi-storey building.

FIG. 9 illustrates a thermal storage circuit wherein the storage tanks 300 and 302 are topside. There are two storage tanks although there could be more and each can be dedicated to heating storage (50° F. to 100° F. range) or cooling storage (42° F. to 60° F.). Valves $A_1$ to $A_4$ are isolation valves to isolate each compartment for servicing, or when it is desired to draw from or use only one storage tank. However, these valves are normally open. Valves $B_1$ to $B_6$ segregate the supply and return headers 304 and 306 so that any one or all of the storage tanks can be dedicated as desired to heating or cooling (or if there are more than two storage tanks, in any combination). Valves $C_1$ to $C_4$, which can be automated in order to be centrally controlled, permit water to be supplied to or withdrawn from either side of the tank diaphragms.

The circuit of FIG. 9 schematically provides for conditioning a multi-storey building and includes a heating water circuit 310, a chilled water circuit 312 and a tower condensing water circuit 314. A heat pump or chiller 316 is provided which includes a clean condenser 318, an evaporator 320 and a tower condenser 322. Other aspects of the refrigeration circuitry are not shown for the sake of clarity. Clean condenser 318 is included in the heating circuit 310 which also includes an auxiliary heater 324, hot water pump 326 and heating load 328. Piping 330 provides a bypass to load 328 and it will be appreciated that appropriate isolation valving with regard to bypass 330, although not shown, would be present. Auxiliary heater 324 may provide heat direct from boilers in the building or from any other heat source. Pipings 322 and 334 interconnect the headers 304 and 306 through valves $C_1$ and $C_2$ respectively to the heating circuit, piping 334 connecting with the heating circuit through thermostatically controlled blending valve 336. Thermostat Th is located in the circuit as shown and not only controls valve 336 but also controls the addition of heat through auxiliary heater 324 as called for in known fashion. Thermostat Th is responsive to ambient temperature and Th also controls other elements as more fully set forth hereinafter. Piping 337 provides a free heating bypass to condenser 318 and interconnects with the circuit prior to pump 326 through diverting valve 339.

The chilled water circuit 312 includes the evaporator 320, a chilled water pump 338 and cooling load 340. Bypass 342 permits bypassing the cooling load and it will be appreciated that the appropriate valving in regard to the bypass although not shown, is provided. Pipings 344 and 346 interconnect the chilled water circuit 312 with the headers 304 and 306 through valves $C_3$ and $C_4$ respectively, piping 344 connecting with the chilled water circuit through thermostatically controlled blending valve 348. Thermostat Tc which controls valve 348 is located in the chilled water circuit before the evaporator 320. Valve 348 is also controlled by thermostat Th in certain instances as more fully set forth hereinafter. Piping 350 bypasses load 340 and connects into piping 344, valve 352 controlling the flow through piping 350 and valve 352 is also responsive to thermostat Tc. Tower condensing water circuit 314 includes tower condenser 322, pump 354 and tower 356 and the cooling capacity of the tower is controlled through the inlet damper vanes in known manner.

In operation, if the chiller capacity balances the cooling load, the chilled water will normally circulate in the chilled water circuit between the evaporator 320 and the load 340. However, in warm weather, the cooling load during the day will most likely exceed the chiller capacity. In this case thermostat Tc opens valve 348 and 42° F. water from storage tank 302 assuming it has already been charged is drawn through header 306, valve $C_3$ and piping 344 to blend with return water from load 340 in order to provide a water inlet temperature to the evaporator which the chiller can handle. Because of the closed system, an equivalent amount of return water (60° F.) will be pushed into the right hand compartment of tank 302 through piping 346, valve $C_4$ and header 304. If on a cool day or even during a portion of a day the chiller evaporator at 100% capacity becomes larger than the load demand then auto valve 352 opens in response to thermostat Tc to permit direct recharge of the left hand side of storage tank 302 through pipings 350, 344, valve $C_3$ and header 306, while the chiller-evaporator is on line during the day or portion thereof.

At night, when the cooling load is minimal the chiller-evaporator 36 may be run in order to recharge storage tank 302 with 42° F. water. When the storage is charged, a signal (not shown) from the diaphragm position can close valve 352 to storage and the chiller can schedule downwardly automatically but continues running if it has an ongoing cooling load. If there is no continuing cooling load, the chiller can be programmed to turn itself off. From the circuitry and the above, it will also be appreciated that chilled water at 42° F. could be drawn from storage without using the chiller, in order to serve small, after-hours cooling loads.

With reference to the heating operation, it will be appreciated by those skilled in this art, that in multistorey buildings, even in winter, a cooling load most always exists and the supplying of heat to the building is basically to balance fabric heat loss. Accordingly, the chiller is run throughout most periods of Winter and when it is being operated to cool the interior of the building, the condenser heat is driven into the clean condenser 318 to serve the heating load 328 and balance it. If there is insufficient condenser heat to balance the heating load, then Th will call upon the auxiliary heater 324 to supplement the heat required. If, however, there is more heat being supplied to the clean condenser 318 than used in the heating load (for example during periods of Spring and Fall) then Th will open valve 336 to piping 334 (valve 339 being open from the clean condenser) to allow surplus condensing heat to head up the left compartment of the heating storage tank 300 with hot condensing water through piping 334, valve $C_2$ and header 304. Water in the right compartment of heating storage tank 300 will enter the heating circuit through header 306, valve $C_1$ and piping 332. When the storage gets full of hot condensing water, the tower condenser circuit 314 would be controlled to automatically cut in to discharge the surplus heat unable to be stored.

At night, if water exists in any storage compartment warm enough to heat the building without being boosted (e.g. 90° F.–105° F. water) it can be circulated directly from storage to the heating load using the diverting valve 339 to bypass the clean condenser. Assuming that the water used is 100° F. it will be returned to the storage at a temperature which may be about 85° F. which, once all 100° F. has been used, is not sufficient to continue heating the building. The only way to continue to adequately heat the building is to blend some of this 85° F. water with other hotter water in order to raise it back to 100° F. This may be done through using the chiller and it is activated to supply the clean condenser 318 as for a daytime cycle. (This assumes that the chiller is not otherwise operating to meet a nighttime cooling load or to regenerate tank 302.) Valves $B_1$ to $B_6$ are appropriately activated to enable some of the 85° F. water to be drawn from storage to the cooling circuit. Enough of this 85° F. water from say the right compartment of storage tank 300 is drawn through header 306, valve $C_3$ and piping 344 with controlled blending of this water with return water in the chilled water circuit by valve 348. The chiller, although cooling the water in the chilled water circuit is run to satisfy the heating demand through the clean condenser 316. Th is used to control valve 348 in this mode of operation. The other compartment (left) of the heating storage tank 300 receives the return water from the chilled water circuit through piping 346, valve $C_4$ and header 304 (cooling load bypass 342 having been activated).

Figure 10:
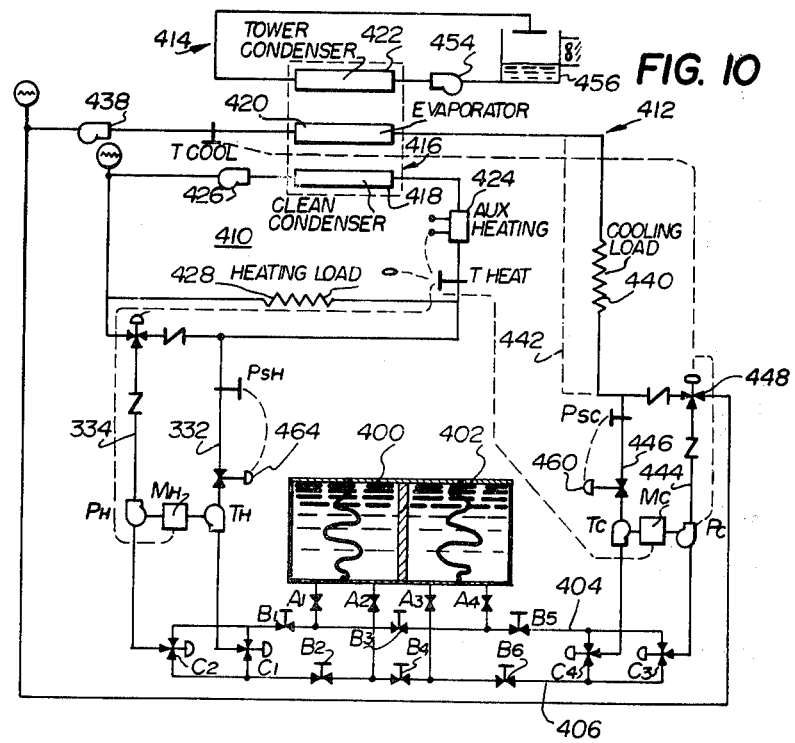
FIG. 10 is a schematic diagram of a piping circuit showing a bottomside location for the storage tanks and the interconnection thereof to both a heating and a cooling circuit for a multi-storey building.

FIG. 10 schematically shows circuitry similar in concept to that of FIG. 9 but directed to a bottomside location of the storage tanks and the attendant use of the energy conserving pump-turbine means of supplying water from the storage tank circuit and removing water from the chilled water circuit when there is a significant pressure difference in the circuits. Like elements in FIG. 10 to those of FIG. 9, when considered in the context of FIGS. 1 and 2 have been indicated with reference numbers in the 400s.

In FIG. 10, if the evaporator capacity balances the cooling load, the chilled water will normally circulate in the chilled water circuit between the evaporator 420 and the load 440. However, in warm weather, the cooling load during the day will most likely exceed the chiller capacity. In this case thermostat T-cool opens valve 448 and starts motor Me and pump Pc so that 42° F. water from storage tank 402 (assuming it has been charged with this temperatured water) is pumped (diverting valves $C_3$ and $C_4$ being appropriately set) through header 406, valve $C_3$ and piping 444 to blend with return water from load 440 in order to provide a water inlet temperature to the evaporator which the chiller can handle. Because of the closed system and the pumping by Pc of stored water into the chilled water circuit, the pressure in the circuit will rise. Pressurestat Psc in piping 446 is responsive to the increase in pressure and opens turbine dump valve 460 thereby permitting water which is at a high pressure in the chilled water circuit to return to the low pressure of the storage tank through turbine Tc, valve C$_4$ and header 404, into the right hand side of tank 402. The pressure break across the turbine Tc conserves input energy required by motor M to operate pump Pc. If the evaporator at 100% capacity becomes larger than the load demand, then direct recharging of the storage tank 402 is possible (with the setting of diverting valves C$_3$ and C$_4$ appropriately reversed) in a manner similar to that set out with reference to the embodiment of FIG. 9. Similarly, at night the chiller-evaporator continues to run in order to regenerate the storage tank 402 with 42° F. With an appropriate bypass around evaporator 420 (not shown) 42° F. water if available can be drawn direct from storage tank 402 without using the evaporator. When regeneration is complete or storage exhausted, water will be depressed in level on one side of the tank anti-blending membrane. The lower inlet pressure to the pump Pc will be its signal to stop. At this time, the turbine dump valve 460 will close tightly.

T-heat provides the lowest radiation temperature necessary to balance the fabric loss of the building. It is mastered by an outdoor ambient temperature schedule in the usual manner. T-heat is programmed to call first upon reclaimed heat, in case the chillers are operating in the occupied or regeneration mode. This is accomplished through varying the water tower capacity with scroll dampers and fan cycling controls (not shown). When insufficient heat is available from reclaim, T-heat can control the auxiliary heater 424 to make up the balance. When condensing temperature rises, owing to the fact that necessary cooling provides more condensing water heat than can be used by the heating system at a given instant, T-heat starts the motor Mh and hot water pump Ph and the pressure sensitive turbine dump valve 464 opens. This brings cooler water from the right side of storage tank 400 through appropriate operation of valves C$_1$ and C$_2$.

Eventually, the storage tank 400 will fill with surplus condensing water and the transfer pump pH will stop and the dump valve will 464 close. At this point, a further rise in condensing temperature would through T-heat activate the tower condensing water system including pump 454 and operates the sequence of damper and fan cycling control which is incorporated with the tower in the usual manner.

Hot water may be pumped directly from storage tank 400 during unoccupied periods if it is high enough in temperature to be useful (with an appropriate bypass (not shown) of the clean condenser being activated). This may be done by operating the hot water pump Ph in a manner noted above with return to storate through turbine Th.

When stored hot water has been used through one pass in this manner, the hot water pump PH will stop through a low pressure cut-off. Further heating may be accomplished from storage tank 400 by valving the tank 400 to feed the chilled water circuit 412. T-heat will then operate the chilled water pump Pc and allow the evaporator to provide enough heat to the clean condenser to satisfy the heating circuit similar to the system shown in FIG. 9.

Although FIGS. 9 and 10 show only two storage tanks, it should be appreciated that any number may be provided, connected in like manner to the appropriate headers. Further, during certain periods of the year, for example, Summer, it may be that the majority or all of the tanks will be dedicated by appropriate valving into a cooling mode of operation. Likewise in Winter, as the heating requirements demand, the majority of the tanks could be valved into a heating mode of operation, with the remaining tanks handling whatever cooling demand there is for stored chilled water.

It should be further appreciated that the basic thermal storage systems shown in FIGS. 1 and 2 are adaptable to various other situations other than in air conditioning a multi-storey building. For example, heat transfer means of these embodiments may be solar energy means such as roof collectors for heating a home. Moreover, the heat transfer means could include an incinerator for burning garbage or be electric heating. Furthermore, the load can be a hot water tank system for domestic hot water supply.

Various modifications in the circuitry involved with reference to the utilization of the flexible membrane in a thermal storage tank system are possible without detracting from the spirit of the invention set forth hereinbefore and defined in the appended claims.

The embodiments of the invention in which an exclusive property or privilege is claimed are defined as follows:

1. A system for conditioning a load to a first predetermined temperature wherein said load is in a closed water piping circuit, including:
   pump means for pumping water about said circuit;
   heat transfer means for conditioning water in said circuit prior to said load to a second predetermined temperature in order to condition said load to said first predetermined temperature;
   thermal storage means including means for separating said thermal storage means into variable volume chambers, said chambers including a first chamber capable of storing water substantially at a third predetermined temperature and a second chamber capable of storing return water at a fourth temperature;
   means for selectively withdrawing water at said third temperature from said first chamber and introducing it into said circuit in order to maintain said second predetermined water temperature; means for permitting a substantially equivalent amount of return water to flow into said second chamber from said circuit at said fourth temperature;
   said means for separating said thermal storage means into said first and second variable volume chambers preventing blending of water at said substantially third predetermined temperature with water at said fourth temperature and varying the volume of said first and second chambers in response to water withdrawn therefrom and flowing thereinto; and
   means for selectively regenerating said first chamber with water at said substantially third predetermined temperature so that said thermal storage means may contain substantially all water at said substantially third predetermined temperature.

2. The system as defined in claim 1 wherein said thermal storage means is a rectangular tank and said separating anti-blending means comprise a vertically floatable baffle, said baffle being substantially the width of said tank and floating upright in water in said tank with a portion thereof above the level of the water and the bottom of said baffle just above the bottom of said tank, means for guiding said baffle for movement from end to end of said tank in response to the volume of water on either side thereof.

3. The system as defined in claim 2 including two additional like floatable baffles, a centre one of said baffles remaining substantially stationary and separating said tank into a hot water storage tank section and a chilled water storage tank section, the other two baffles providing respective separating and anti-blending means for said hot water storage tank section and said chilled water section, piping and valve means associated with portions of said tank whereby said centre one of said baffles may be selectively moved and the tank converted entirely to a heating or cooling mode or to any combination thereof.

4. The system as defined in claim 1 wherein said storage tank is closed and includes peripheral walls and opposed end walls, said separating and anti-blending means comprising a flexible impervious membrane, said membrane being in the form of a bag having a closed and an open end, said closed end capable of taking the shape of either end wall and the open end being secured about the peripheral walls at substantially the mid-point thereof between said end walls.

5. The system as defined in claim 1 wherein water pressure in said circuit including said load is at a first pressure and water in said thermal storage means is at a second pressure substantially lower than said first pressure;
said means for selectively withdrawing water from said first chamber and introducing it into said circuit including further pump means;
said means for permitting a substantially equivalent amount of return water to flow into said second chamber from said circuit including turbine means, a motor means operatively connected to and driving said further pump means;
said turbine being operatively connected to said motor means whereby energy required to pump water from said second pressure to said first pressure is conserved through flow of return water in said turbine means.

6. The system of claim 1 wherein said thermal storage means includes a plurality of separate storage tanks each having an impervious flexible membrane defining respective variable volume chambers, and means including piping and valve means to permit any combination of said thermal storage tanks to be included into a selected mode of operation for selectively withdrawing water from and permitting flow of water into respective chambers of said plurality of tanks.

7. An air conditioning system for a building, said system including heat pump means including evaporator means, clean condenser means and tower condenser means;
a chilled water circuit including said evaporator means, chilled water pump means and heat exchange means for selectively cooling areas of said building to a predetermined temperature;
a heating water circuit including said clean condenser means, heating water pump means, auxiliary heating means and heat exchange means for selectively heating areas of said building to a predetermined temperature, said clean condenser reclaiming heat in the building for said heating water circuit;
a water tower circuit including said tower condenser means, water tower pump means and a cooling tower, said water tower circuit removing unwanted heat from the building;
thermal storage means including at least two storage tanks, each tank having means for separating the tank into first and second variable volume chambers and preventing blending of water between the respective two chambers;
means for selectively including storage tanks into said chilled water circuit and means for selectively including storage tanks into said heating water circuit as demand for cooling and heating of the building requires in order to supplement the respective chilled water and heating water circuits with water stored at a temperature substantially that of the temperature of water demanded by said respective circuits and thereby meet the cooling and heating demand in the building at the particular time;
said separating and anti-blending means comprising impervious flexible membranes attached about peripheral walls of respective tanks at their mid-points to divide the respective tanks into said two chambers.

8. The air conditioning system of claim 7 wherein water pressures in each said heating and chilled water circuits include said respective heating and cooling loads are relatively high whereas water in said thermal storage means is at a relatively low pressure;
said means for selectively including storage tanks into said chilled water circuit including means for withdrawing water from first chambers of said tanks including further chilled water pump means and means for permitting an equivalent amount of return water to flow into second chambers including chilled water turbine means;
motor means operatively connected to and driving said further chilled water pump means, said chilled water turbine means being operatively connected to said motor means whereby energy required to pump water from said low pressure chilled water storage tanks into said high pressure chilled water circuit is conserved through flow of return water in said chilled water turbine means;
said means for selectively including storage tanks into said heating water circuit including means for withdrawing water from first chambers of said tanks including further heating water pump means, and means for permitting an equivalent amount of return water to flow into second chambers including heating water turbine means;
additional motor means operatively connected to and driving said further heating water pump means, said heating water turbine means being operatively connected to said additional motor means whereby energy required to pump water from said low pressure heating water storage tanks into said high pressure heating water circuit is conserved through flow of return water in said heating water turbine means.

* * * * *